G. N. PATTERSON.
HARVESTER.
APPLICATION FILED NOV. 18, 1916.
1,243,095.
Patented Oct. 16, 1917.
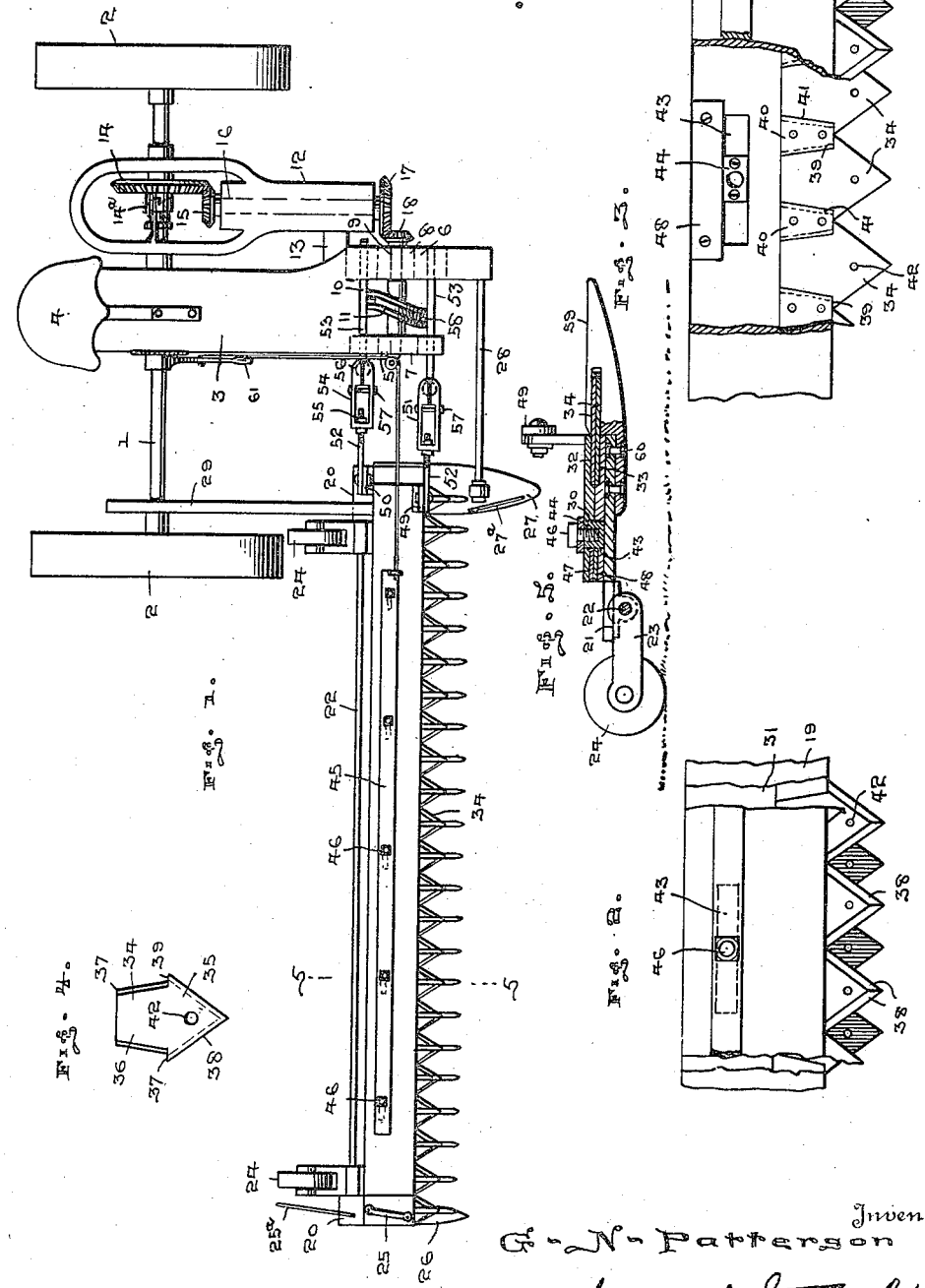

UNITED STATES PATENT OFFICE.

GEORGE N. PATTERSON, OF DURANGO, COLORADO.

HARVESTER.

1,243,095. Specification of Letters Patent. Patented Oct. 16, 1917.

Application filed November 18, 1916. Serial No. 132,055.

*To all whom it may concern:*

Be it known that I, GEORGE N. PATTERSON, a citizen of the United States, residing at Durango, in the county of La Plata and State of Colorado, have invented certain new and useful Improvements in Harvesters; and I do hereby declare the following to be a full, clear, and exact description of the invention, such as will enable others skilled in the art to which it appertains to make and use the same.

This invention relates to harvesters and more particularly to the class of mowers.

The primary object of the invention is the provision of a mower embodying superimposed cutter bars, each having a plurality of cutting knives attached thereto, each cutter bar being designed to be reciprocated oppositely whereby a more effective cutting action may be had.

Another object of the invention is the provision of a mowing machine embodying a plurality of cutter bars, each having a pitman connected to one end thereof, and means operatively connected to the pitmen, whereby a reciprocating action may be imparted to each of the cutter bars.

A further object of the invention is the provision of a machine of the above stated character comprising a cam mounted upon a shaft positively driven from the traction wheels of the device, and having the cutter bars of the machine operatively connected thereto by pitman rods, whereby the operating power from the traction wheels is more easily and evenly applied to the reciprocating cutter bars.

With these and other objects in view, as will appear as the description proceeds, the invention comprises the various novel features of construction, combination and arrangement of parts as will be more fully hereinafter described and set forth with particularity in the appended claim.

Referring to the drawings,

Figure 1 is a plan view of my improved mowing machine.

Fig. 2 is a fragmentary enlarged plan view of portions of the cutter bars.

Fig. 3 is an enlarged fragmentary plan view of the cutter bars, portions of the upper cutter bar being broken away.

Fig. 4 is an enlarged plan view of one of the cutter knives, and

Fig. 5 is an enlarged transverse sectional view taken on line 5—5 of Fig. 1.

Similar characters of reference are used to denote like parts throughout the accompanying drawings.

Referring more particularly to the drawings my improved mowing machine is shown to consist of an axle 1 having suitable traction wheels 2 attached to its terminal ends. Mounted upon the axle 1 intermediate its ends is a main frame 3, which latter is provided at its rear end with a driver's seat 4. This main frame 3 extends forwardly of the axle 1 and has its forward end bifurcated to provide arms 5 and 6.

Mounted transversely of and journaled in bearings 7 and 8 is a cam shaft 9, which latter is provided with a cam 10 disposed between the arms 5 and 6. This cam 10 is provided circumferentially with a spirally arranged groove 11.

Mounted upon the axle 1 and extending forwardly thereof in spaced relation to the main frame 3 is a yoke-shaped frame 12, the forward end of which is braced to the main frame by a brace 13.

A beveled gear 14 is mounted upon the shaft 1 and disposed within the rear end of the yoke-shaped frame 12 and meshes with a pinion 15 on the rear end of the shaft 16 which extends forwardly of the machine and through the front portion of the yoke frame 12. This gear is adapted to be thrown in and out of gear with the driving shaft by any suitable clutch mechanism, as indicated at 14$^a$. The forward end of this shaft 16 is provided with a beveled gear 17, which meshes with a pinion 18 on the outer end of the cam shaft 9. By this arrangement it will be seen that as the machine moves forward, power will be transmitted from the axle 1 through the shaft 16 to the cam shaft 9 for a purpose which will presently appear.

Extending laterally from the machine and in substantially parallel spaced relation to the axle 1 is the cutting mechanism of the machine, which is shown to consist of a finger bar 19. Ears or lugs 20 extend rearwardly from the opposite ends of the finger bar 19 and are provided with bearings 21 in which is journaled a rod 22. Mounted upon this rod at opposite ends and adjacent the lugs 20 are caster wheel brackets 23, each carrying a caster wheel 24, that is allowed to play over rough ground.

A guard 25 is carried by the outer end of the finger bar and extending rearwardly thereof is a guide finger 25$^a$ which serves to assist in keeping the cut material in the swath.

The opposite ends of the finger bar 19 are supported by the usual form of runner 26 and shoe 27. The shoe 27 is braced and connected to the forward end of the arm 6 of the main frame 3 by a brace rod 28 and carries a guard 27ª. The finger bar 19 is also connected to the axle 1 by a suitable brace bar 29.

Arranged upon the finger bar 19 is a pair of superimposed cutter bars 30 and 31, the forward opposed faces and edges of each cutter bar being rabbeted, as indicated at 32 and 33. These rabbeted portions are designed to each receive a plurality of cutting knives 34.

As shown clearly in Fig. 4, each cutting knife is shown to consist of a substantially V-shaped head 35 which embodies a body portion 36, of a width slightly less than that of the head 35. The side edges of the body 36 are beveled, as clearly shown at 37 and are inclined toward each other from the head to the rear of the body. The forward edges of the head 35 are beveled oppositely to the body 34, to provide cutting edges 38. By making the body portion 36 slightly smaller than the head 35, it will be apparent that shoulders 39 are thus formed, the purpose of which will presently appear.

By reference to Fig. 3, it will be seen that the knife blades are arranged in spaced relation to each other within the rabbet 33 of the cutter bar 31, and are held in such positions by clamping plates 40, which are beveled throughout the under side of their longitudinal edges, as indicated at 41, and are designed to overlie the beveled side edges of the body portions 36 of the respective cutting knives 34. These clamping plates 40 are securely held in position by rivets, bolts, or any other fastening means found desirable.

The head 35 of each cutting knife is provided with an opening 42 in which may be inserted a suitable tool, whereby the cutting knives may be forced into position beneath the clamping plates or may be removed from their operative position.

While I have described the construction and arrangement of the cutting knives arranged in the rabbet 33 of the cutter bar 31, I desire to have it understood that the construction and arrangement of the knives arranged in the rabbet 32 of the cutter bar 30 are identical with those just described.

Each cutter bar is provided with a plurality of spaced longitudinal slots 43 up through which extend bosses or lugs 44 that are rigidly secured upon the upper face of the finger bar 19. These longitudinal slots 43 are designed to limit the reciprocating motion of each cutter bar 30 and 31.

A retaining strip 45 is secured lengthwise over the cutter bar 30 upon the bosses 44 by set screws 46, which extend down through the strip 45 and are threadingly connected to the bosses 44.

Formed in the opposed faces of each cutter bar, opposite each boss 44 are recesses 47 in which are removably arranged bearing plates 48, and securely held in place by screws 48' as clearly shown in Fig. 3. These bearing plates are designed to coöperate with each other to reduce the wear between the rear longitudinal edges of said cutter bars and also to produce a better cutting action between the forward edges of the cutting blades, as will be obvious from the construction shown.

Upstanding ears 49 and 50 are formed at one end of each cutter bar, and have connected to each of them respectively, a pitman rod 51. Each of these pitman rods 51 is shown to consist of rod sections 52 and 53, the sections 52 being each pivotally connected to the upstanding ears 49 and 50 respectively. The opposite end of the rods 52 are each threadingly connected to a swivel joint 54. Each swivel joint is shown to be of substantially link formation, and has one end provided with an aperture through which extends the threaded end of the rod 52, nuts 55 being connected to the rod 52 in order that the link 54 may be securely held thereon and yet be permitted of a rotary movement. The forward end of the link 54 is split and is provided with a socket designed to receive the ball head 56 of the pitman rod section 53. A clamping bolt 57 extends through the link whereby the split end may be clamped together over the ball head 56.

Each of the rod sections 53 extend laterally through the arms 5 and 6 in parallel spaced relation on opposite sides of the cam 10, and are each provided with a roller bearing 58 which projects into and rides within the circumferential offset cam groove 11.

In order to protect each of the cutting knives 34, during the operation of the device, I provide a suitable guard finger 59, which may be secured to the finger bar 19 in any suitable manner, such as by bolts 60, as clearly indicated in Fig. 5 of the drawings.

Any suitable draft means, not shown, may be attached to the main frame 3, in order that a draft animal or animals may be hitched thereto to draw the mowing machine.

From the foregoing description, it will be apparent that in the operation of the device, the power that is transmitted to the cam shaft 9 from the traction wheels 2 will rotate the cam 10, which in turn will cause the pitman rods 52 to reciprocate oppositely to one another, this in turn imparting or transmitting a reciprocating motion to each cutter bar. By this particular construction it will be manifest that the power is more easily and evenly applied to the cutter bars than could otherwise be accomplished.

While I have shown, conventionally, means for raising and lowering the sickle bar, as indicated by the reference numeral 61, I desire to have it understood that I do not lay any claims to the particular means for raising and lowering the sickle bar, but desire to have it understood that any suitable means may be used for this purpose.

What I claim is:—

In a mowing machine, the combination of a pair of cutter bars having a plurality of spaced opposed recesses in their coacting faces and at the rear edges thereof, a plurality of wear plates inlaid in said opposed recesses, and means for securing each wear plate in its respective recess.

In testimony whereof I have signed my name to this specification in the presence of two subscribing witnesses.

GEORGE N. PATTERSON.

Witnesses:
  ROBT. S. CLEMENTS,
  C. L. YOUNG, Jr.

Copies of this patent may be obtained for five cents each, by addressing the "Commissioner of Patents, Washington, D. C."